Aug. 23, 1932.  E. JAMES  1,873,591
RADIATOR CONNECTION
Filed May 11, 1928  2 Sheets-Sheet 1
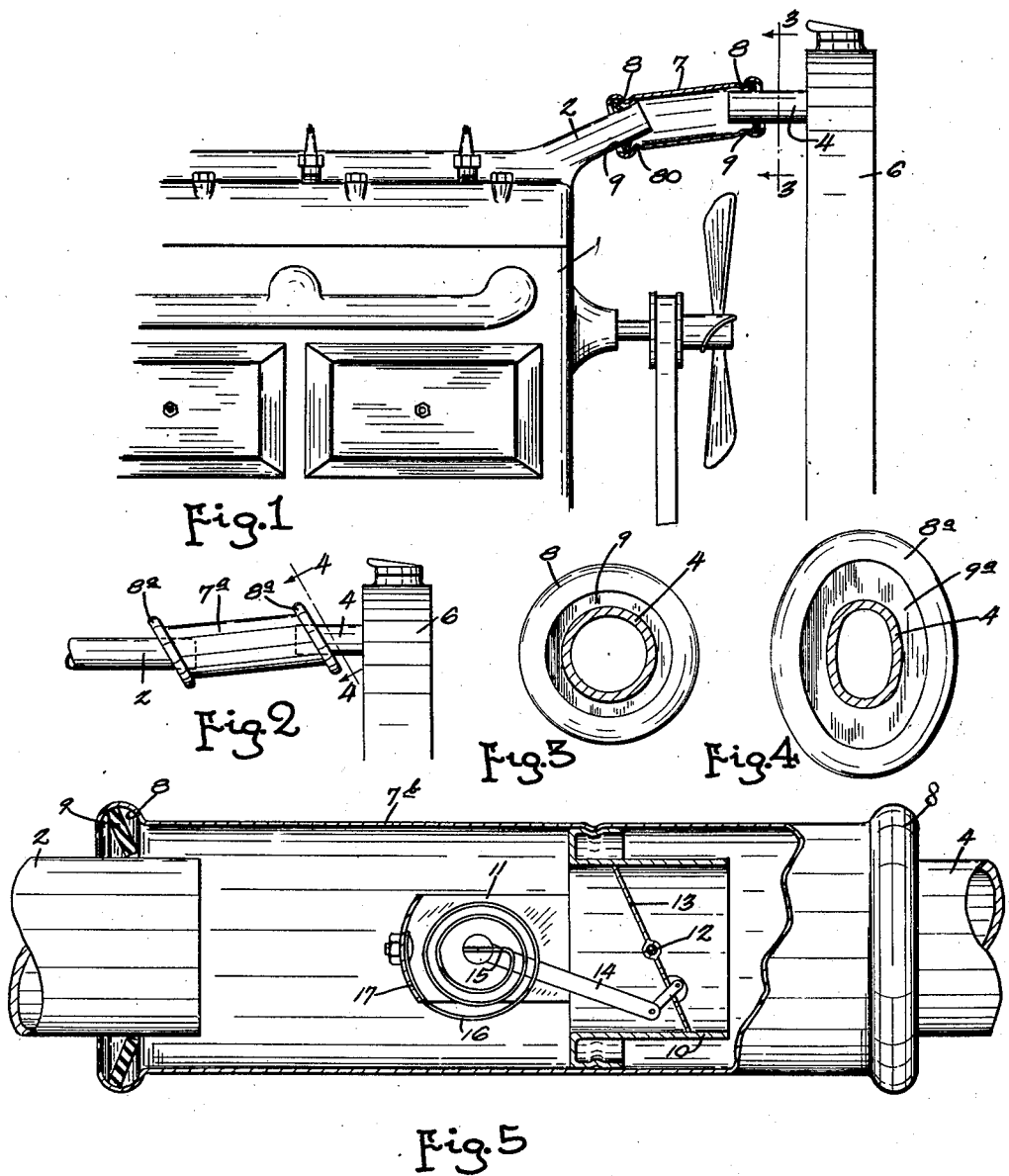
Edward James
Inventor
by Smith and Freeman
Attorneys Edward James
Inventor
by Smith and Freeman
Attorneys Patented Aug. 23, 1932

1,873,591

UNITED STATES PATENT OFFICE

EDWARD JAMES, OF CLEVELAND, OHIO, ASSIGNOR, BY MESNE ASSIGNMENTS, TO HAROLD ELNO SMITH, OF CLEVELAND HEIGHTS, OHIO

RADIATOR CONNECTION

Application filed May 11, 1928. Serial No. 276,859.

This invention relates to self-propelled vehicles and envisages the provision of a new, cheapened, simplified and improved connection between the engine and radiator thereof. It is well known that in the usual present-day automobile construction the connection of the radiator to the engine is effected by means of two flexible rubber pipes, in order to compensate for variations in position between the radiator and engine connections, and to permit the engine to vibrate independently of the radiator. These rubber connections are troublesome as regards leakage, they are attacked and softened by many of the anti-freeze compounds employed, they are unduly expensive, and they cannot successfully be used as a support or housing for a thermostat. The objects of my invention are the provision of a cheap, and simple tubular connection which can be applied and removed without tools, will be immune to anti-freeze compositions, will constitute an acceptable support for a thermostat, will be proof against leakage, will afford the same facility for independent movement as does the present rubber hose, shall be readily applied despite lack of alignment between the different connections, can be readily employed with a by-pass conduit, and shall facilitate the washing out of the circulating system when desired. Other objects and advantages of the invention will become apparent as the description proceeds.

Figure 6:
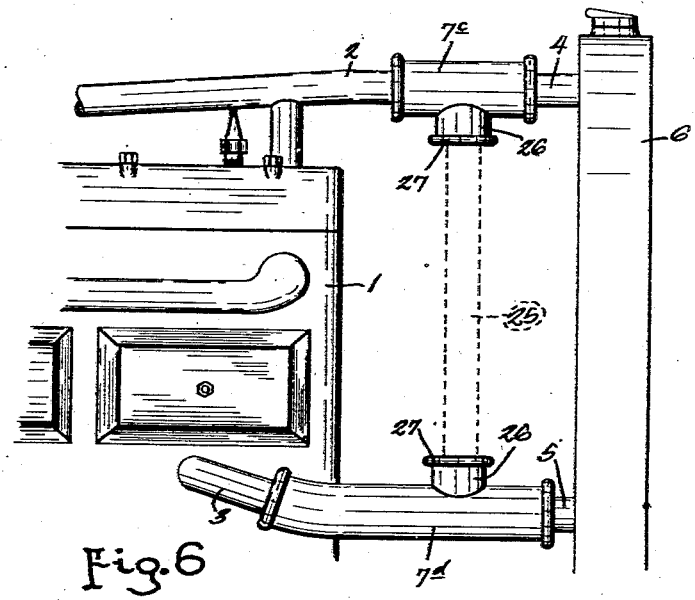
Figure 7:
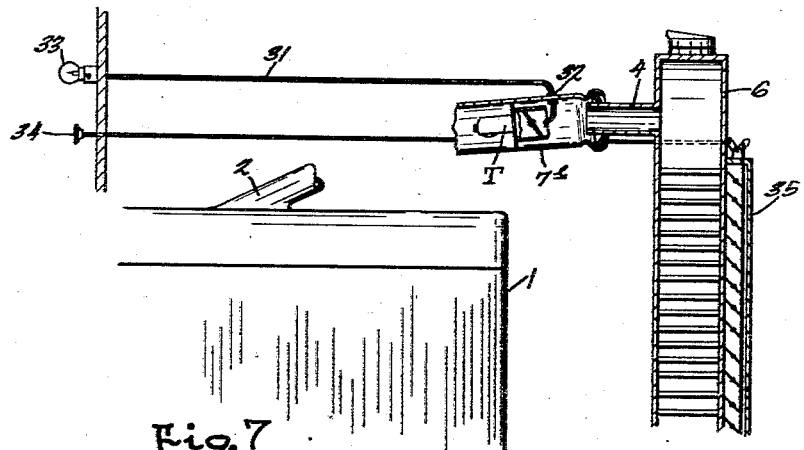

In the drawings accompanying and forming a part of this application I have shown a few of the many physical forms in which my inventive idea may be embodied. Fig. 1 is a side elevation of part of an automobile engine and radiator showing one of the simplest forms of my connections applied thereto; Fig. 2 illustrates a part of a modified arrangement of the parts, with a modified form of connection; Fig. 3 is a sectional view corresponding to the line 3—3 of Fig. 1; Fig. 4 is a sectional view corresponding to the line 4—4 of Fig. 2; Fig. 5 illustrates another connection containing my improvements and constituting the housing for a thermostat; Fig. 6 is another view showing part of an engine and radiator equipped with a modified form of my connector including a by-pass conduit; and Fig. 7 illustrates another modification of my invention.

The internal combustion motor 1 of an automobile is provided with tubular nipples 2, 3, adapted for attachment to the corresponding nipples 4 and 5 located at upper and lower ends of the radiator 6. My improved connector comprises essentially a hollow tube 7 of rigid material, somewhat larger than the nipples, and of sufficient length to overlap the facing ends of the same. At each end said tube 7 is formed with an inwardly-facing slant-walled, circumferential recess 8, and located in this recess is a suitable gasket or packing ring 9 of flexible material such for example as soft rubber. The tube 7 may be of any suitable rigid material, preferably but not necessarily metal. Brass, of course, is peculiarly desirable but ferrous metal, especially if suitably plated or enameled or painted is entirely satisfactory. The recesses 8—8 are preferably formed by means of dies or suitable spinning tools. When the metal of the tube is lacking in ductility it is sometimes convenient to form these recesses, partly by constricting the tube material adjacent thereto as shown at 80 in Fig. 1. It is likewise possible to form the same entirely by displacing the tube outwardly as shown in Fig. 5.

The aperture in the gasket 9 is of such size as to receive the nipples 2 and 4 with some stretching, which also means that the packing ring itself which is preferably flat originally assumes a flaring or dished form and its outer part assumes a new angle with relation to the wall of the recess 8. Inasmuch as the inner diameter of the tube 7 is always greater than the diameter of the nipples 2 and 4, the parts have a considerable degree of angular movement, as necessary to permit the application of the connection after the engine and radiator are both mounted in position, and to enable free relative vibration. The external diameter of the gasket is preferably somewhat greater originally than the inner diameter of the tube 7 and recess 8, while the opening therethrough is normally smaller than the external diameter of the entering member or nipple.

Taking for example the arrangement shown in Fig. 1 the tube 7 may first, for example, be applied to the nipple 2, and pushed so far thereon as to enable it to clear the nipple 4. The application of the tube and its gasket 9 to the nipple 2 is comparatively easy, since the dishing of the gasket allows ready movement in one direction, but the gripping of the gasket renders movement in the opposite direction considerably more difficult, although this also can be effected by simultaneously twisting and pulling on the tube until the nipple 4 is likewise introduced into the other gasket, which also now assumes a dished shape but with an opposite inclination. Owing to the fact that these two gaskets are dished in opposite directions, each opposing movement in one direction, there is no tendency or possibility for the tube 7 to creep, and any increase of internal pressure serves but to increase the tightness of the joints, although the different parts are at all times free to vibrate or move relatively to each other.

It is sometimes desirable, especially when clearances are small or diameters large, to form the ends of the connecting tube with oblique ends, as shown in Fig. 2, where the tube 7 is formed with its enlargements 8ª oblique to the two axes. When the tube ends are square as shown in Fig. 1, the interior of the recess is circular and the gasket also circular as shown in Fig. 3. When the tube is cut obliquely as shown in Fig. 2, then if the tube be itself cylindrical the enlargement 8ª and with it the gasket 9ª both become elliptical as shown in Fig. 4. These minor modifications of my construction are found convenient in some installations.

It has been found desirable in some cases to locate a thermostatically controlled valve in the circulating system to improve the operation of the engine by maintaining the jacket liquid at the optimum temperature and not allowing circulation to occur until this temperature is attained. Such a thermostat can with particular facility be combined in and supported by my improved connection as shown in Fig. 5 wherein 7ᵇ denotes a tubular connection constructed as heretofore described and having sleeved therein a hollow casing 10 carrying a bracket 11 pointing towards the engine nipple 2. Pivoted in the casing 10 on a horizontal axis 12 is a butterfly-valve 13 connected by a link 14 with the free end 15 of a spiral 16 of thermostatic metal whose outer end is fastened to the cross bar 17 carried by the arms 11. Upon a predetermined increase in temperature the coil expands and opens the valve 13. It will be understood that the detail construction and mode of attachment of the thermostat and valve are not important since these parts can be introduced into my improved connection in any suitable manner and the arrangement illustrated is chosen solely for purposes of illustration.

In the mechanism shown in Fig. 6 the upper and lower connections 7ᶜ—7ᵈ are formed with lateral connections adapted for the reception either of a vertical pipe 25 by which a part of the liquid can be by-passed so as to avoid the radiator 6, or so as to receive a hose for the purpose of filling the radiator or rinsing out accumulations of sediment therein. In this case I have shown the sleeves as each being formed with a side branch 26 having an enlargement 27 at its end adapted for the reception of the inserted pipe in any manner desired. The sleeve 7ᵈ is shown as bent.

In the modification shown in Fig. 7 I have shown yet another feature which can be employed with my improved connection namely: an electric circuit element 31 carried by an insulator 32 is supported by the side wall of the tube 7ᵉ in such association with the thermostat T therein that when the thermostat valve is opened, the circuit is closed so as to illuminate the bulb 33 carried by the instrument board and thereby notifying the operator to acuate the handle 34 to open the shutter 35 with which the radiator 6 is provided.

It will be understood that the present application is limited to automobile construction, wherein my improved connection exhibits peculiar advantages, not shared by or common to other pipe connections, but that said pipe connection is not claimed broadly in the present case inasmuch as the broad claims thereto constitute the subject-matter of my copending case filed May 11, 1928, Serial No. 276,858, but that many changes in detail can be made without departing from my inventive idea and I do not limit myself in any wise except as specifically recited in my several claims which I desire may be construed broadly each independent of limitations contained in other claims.

Having thus described my invention what I claim is:

1. In a self propelled vehicle, the combination with an internal combustion engine having a hollow nipple and a radiator having a hollow nipple spaced therefrom, of a hollow connecting tube of rigid impervious material telescoped over both nipples, and elastic gaskets interposed between the interior of the tube and the exteriors of said nipples, said radiator and engine exhibiting variable positions and movements and said connecting tube being similarly movable relative to said nipples and without substantial leakage.

2. In a self propelled vehicle, the combination with an internal combustion engine having a hollow nipple and a radiator having a hollow nipple spaced therefrom, of a hollow connecting tube of rigid impervious material, said tube being of a length to overlap both of said nipples and of a diameter to receive them loosely therein, and a gasket of soft, elastic, impervious material secured in each end of said tube and tightly embracing each nipple, said radiator and engine exhibiting variable positions and movements, and said connecting tube being similarly movable relative to said nipples and without substantial leakage.

3. In a self propelled vehicle, the combination with an internal combustion engine having a hollow nipple and a radiator having a hollow nipple spaced therefrom, of a hollow connecting tube of rigid impervious material, said tube being of a length to overlap both of said nipples and of a diameter to receive them loosely therein, said tube having an inwardly-facing circumferential recess at each end, and a gasket of soft, elastic, impervious material seated in each recess and tightly embracing one of said nipples.

4. In a self propelled vehicle, the combination with an internal combustion engine having a hollow nipple and a radiator having a hollow nipple spaced therefrom, of a hollow connecting tube of rigid impervious material telescoped over both nipples, a valve located in said tube, a heat-responsive element located in said tube and operatively connected to said valve, and a gasket of soft, flexible elastic material interposed between the interior of said tube and the exterior of each nipple, said radiator and engine exhibiting variable positions and movements, and said connecting tube being similarly movable relative to said nipples and without substantial leakage.

5. In a self propelled vehicle, the combination with an internal combustion engine having a hollow nipple and a radiator having a hollow nipple spaced therefrom, a hollow connecting tube of rigid impervious material structurally separate from both engine and radiator and loosely overlapping both of said nipples, a valve and a heat responsive element located in said tube and operatively connected together, and flexible gaskets interposed between each end of the tube and the corresponding nipple.

6. As an article of manufacture and sale, a thermostatic flow-connection for self-propelled vehicles, comprising a metal tube adapted to overlap and receive loosely the opposed nipple of an internal combustion engine and its radiator, a valve and a heat-responsive element operatively connected together and located inside said tube and spaced from both ends thereof, and yieldingly flexible, gasket-means carried by each end of said tube and projecting inwardly from the walls thereof and adapted to receive and embrace tightly the respective nipples.

In testimony whereof I hereunto affix my signature.

EDWARD JAMES.